United States Patent [19]

Parsons

[11] Patent Number: 4,936,169

[45] Date of Patent: Jun. 26, 1990

[54] DEVICE FOR POSITIONING AND APPLYING FASTENERS

[76] Inventor: Billy J. Parsons, Rte. 1, Box 253 F, Custer, S. Dak. 57730

[21] Appl. No.: 223,422

[22] Filed: Jul. 25, 1988

[51] Int. Cl.$^5$ .............................................. B25B 23/02
[52] U.S. Cl. .................................... 81/57.37; 81/57.5; 81/177.4
[58] Field of Search ................... 81/51.37, 51.5, 177.4, 81/490

[56] References Cited

U.S. PATENT DOCUMENTS

| | | | |
|---|---|---|---|
| 1,815,594 | 7/1931 | Shaw et al. | |
| 2,266,302 | 12/1941 | Blair | 81/57.37 |
| 2,633,169 | 3/1953 | Siems | 145/52 |
| 2,774,401 | 12/1956 | Hallam | 145/52 |
| 2,878,700 | 3/1959 | Reynolds | 81/54 |
| 2,884,971 | 5/1959 | Dierker | 145/52 |
| 2,943,652 | 7/1960 | Chilton | 144/32 |
| 3,299,499 | 1/1967 | Ruminsky | 29/413 |
| 3,656,520 | 4/1972 | Caffa | 81/57.37 |
| 4,018,254 | 4/1977 | DeCaro | 144/32 R |
| 4,059,034 | 11/1977 | Hornung | 81/57.37 |
| 4,294,142 | 10/1981 | Sugahara et al. | 81/57.37 |
| 4,428,261 | 1/1984 | Takatsu et al. | 81/434 |
| 4,653,356 | 3/1987 | Golden | 81/57.5 |

*Primary Examiner*—Judy Hartman
*Attorney, Agent, or Firm*—Harold A. Burdick

[57] ABSTRACT

A device for positioning and applying fasteners, such as screws, to a work object is disclosed which includes an applicator positioned adjacent to a rotatable cylinder. The cylinder is configured to hold a plurality of fasteners therein and to position a selected fastener for engagement with the applicator by rotation of the cylinder. The fasteners may be prepackaged to assure ease of loading in the cylinder and more uniform initial orientation of the fasteners in the device. The device may be configured for either manual or machine driven operation.

15 Claims, 4 Drawing Sheets

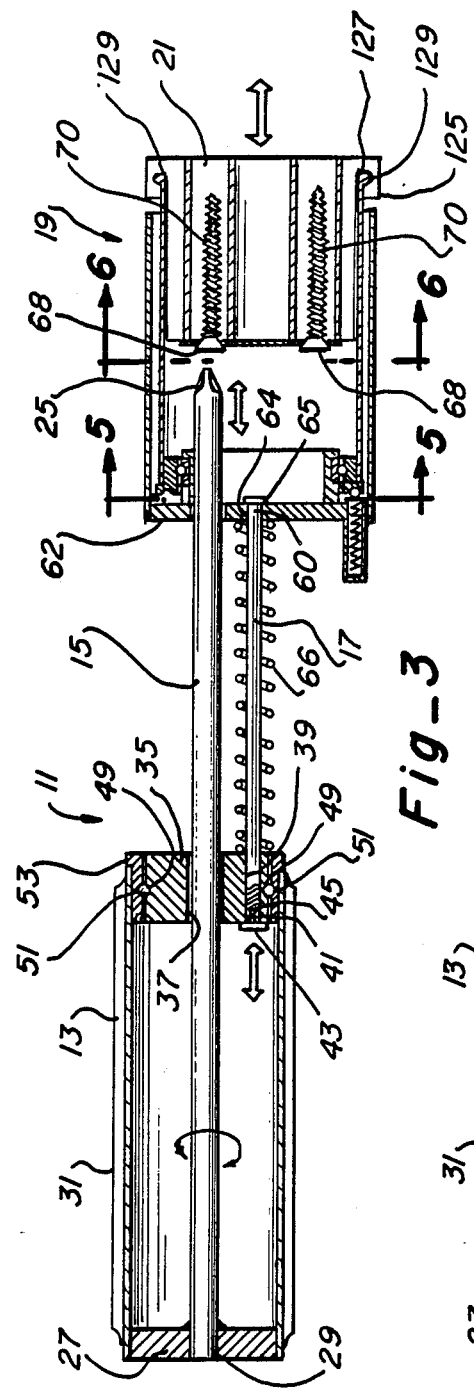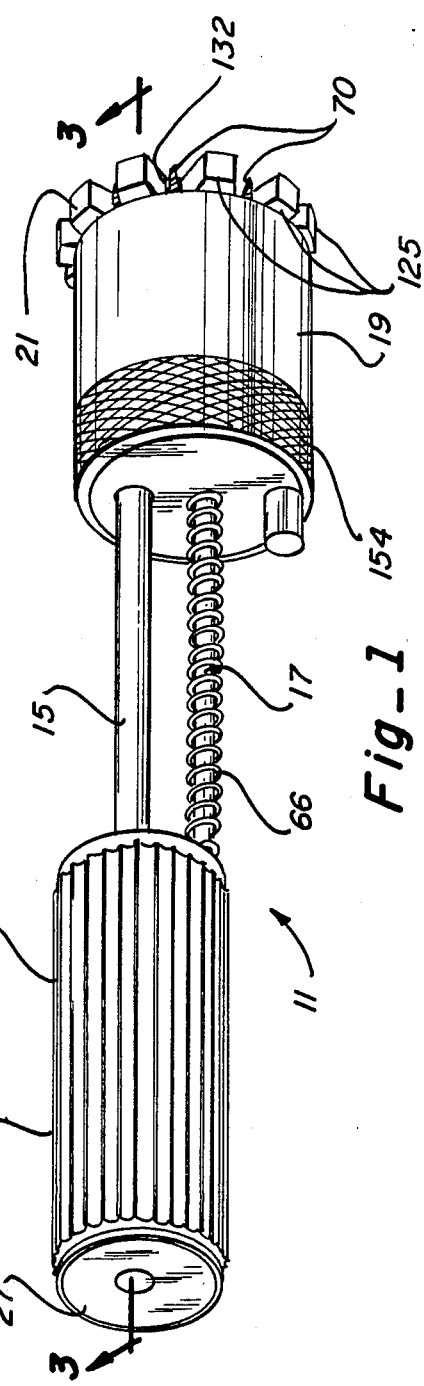

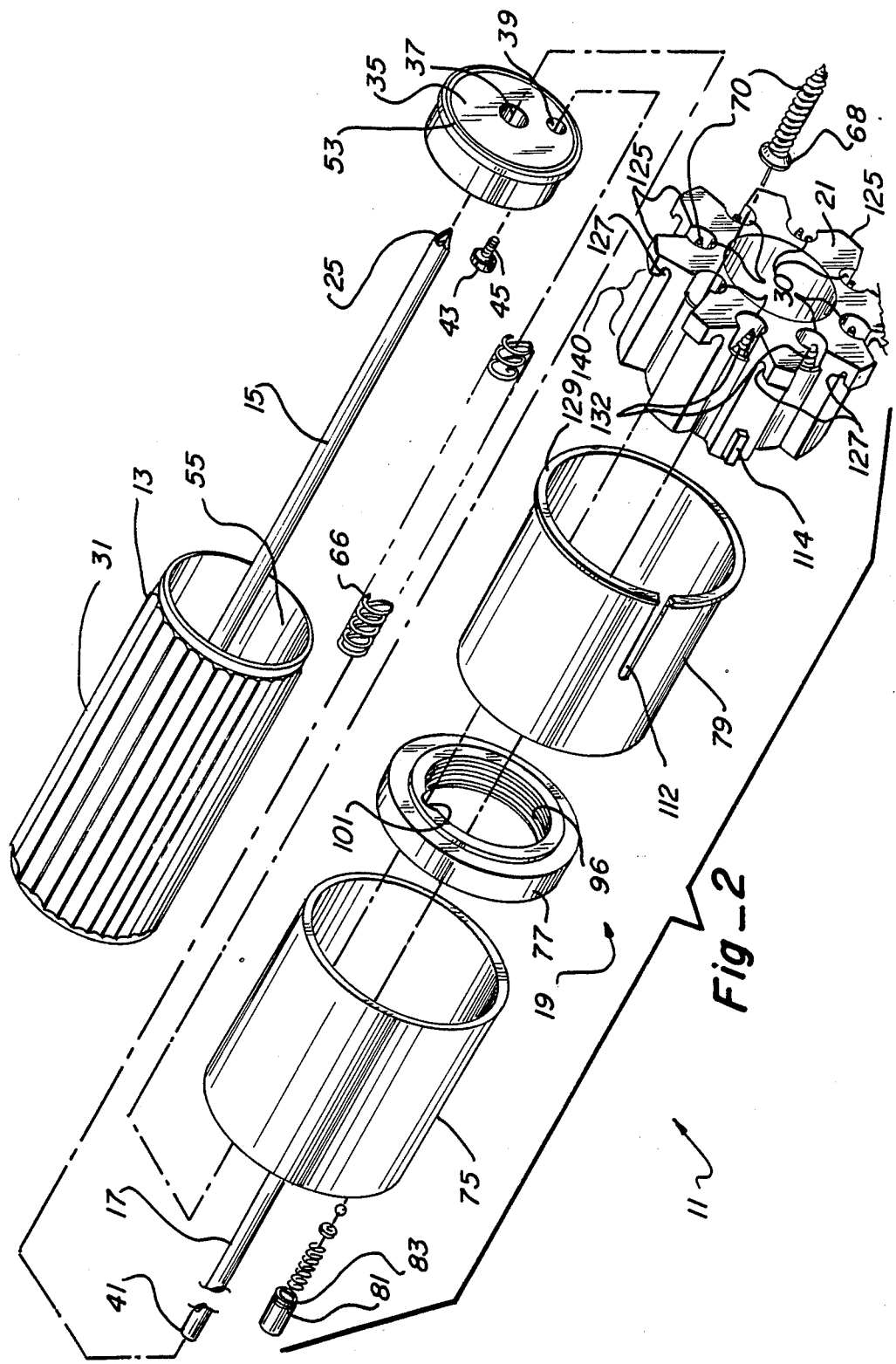

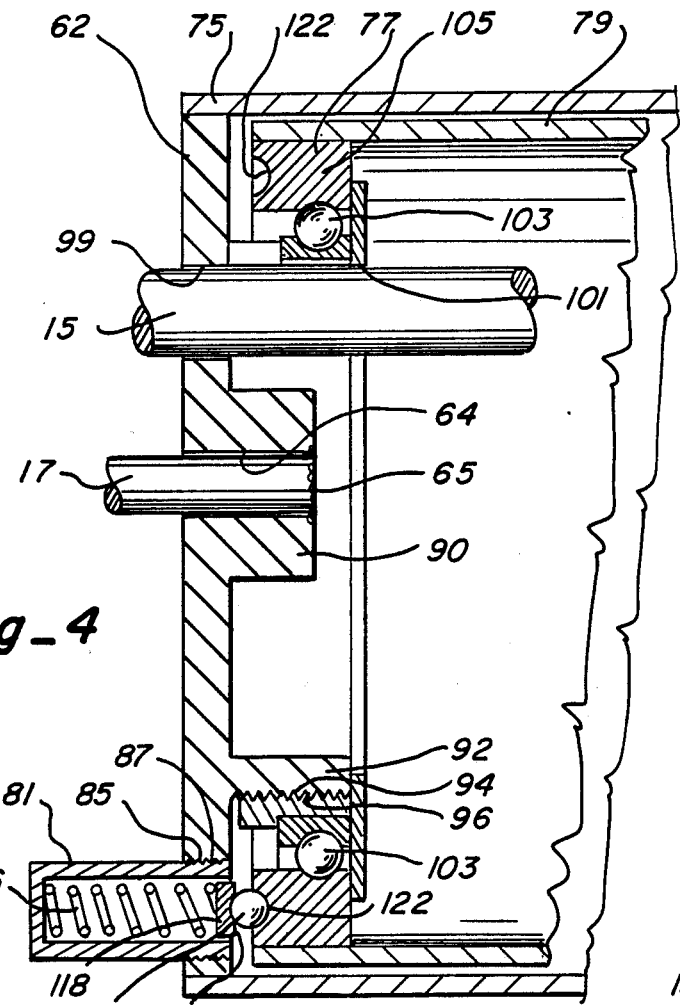
Fig_4
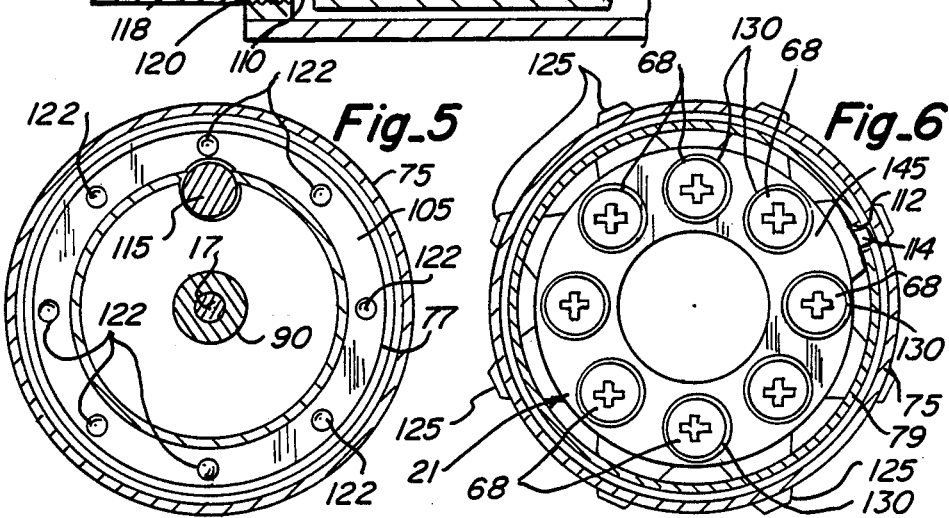
Fig_5
Fig_6

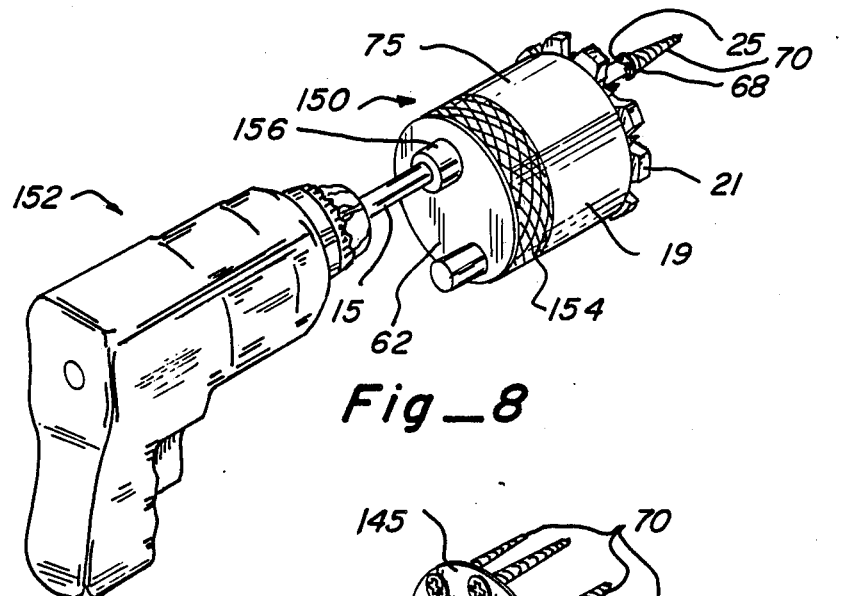
Fig_8
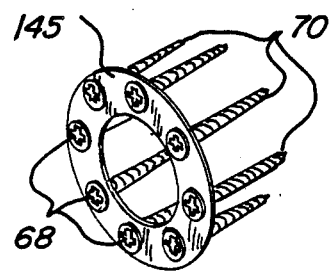
Fig_7

4,936,169

DEVICE FOR POSITIONING AND APPLYING FASTENERS

FIELD OF THE INVENTION

This invention relates to a device for applying fasteners to a work object and, more particularly, relates to a device for positioning and applying selected ones of a plurality of fasteners, such as screws, retainable in the device.

BACKGROUND OF THE INVENTION

Devices for positioning and applying fasteners, such as screws, rivets, staples, nails and the like, have been heretofore suggested and/or utilized, and, more particularly, have included devices for positioning and applying a fastener which include mechanisms for maintaining a supply of such fasteners adjacent to the device and for serially positioning fasteners from the supply for application thereof to a work object (see, for example, U.S. Pat. Nos. 4,294,142, 2,943,652, 2,878,700, and 1,815,594).

Devices for attachment to a standard driving tool, such as a power driver, have also been heretofore suggested and/or utilized for driving a screw maintained in a feeding mechanism having a plurality of screws positioned thereat (see, for example, U.S. Pat. Nos. 4,018,254, 3,299,499 and 4,428,261), as have manually operated devices for holding a screw in an engaged position with a driver (see, for example, U.S. Pat. Nos. 2,884,971, 2,774,401, and 2,633,169).

Such previously known devices for positioning and applying fasteners, however have often proven to be cumbersome in operation, have not been entirely successful in operation in restricted spaces where a more compact instrument is desirable, and/or have not maintained the supply of fasteners to be fed to the driving mechanism substantially within the device. As may be appreciated, further improvement of such devices could therefore be utilized.

SUMMARY OF THE INVENTION

This invention provides a device for positioning and applying selected ones of a plurality of fasteners, such as screws, retained in the device to a work object which is compact and configurable for manual or machine driven operation. The device includes a selectively movable portion for receiving and retaining the plurality of fasteners therein and for orienting the fasteners for engagement of a selected one thereof by an engaging portion of an applicator positioned within the movable portion of the device.

It is therefore an object of this invention to provide a device for positioning and applying selected ones of a plurality of fasteners retained in the device.

It is another object of this invention to provide a compact device for positioning and applying selected ones of a plurality of fasteners retained in the device having an applicator positioned through a rotatable portion for receiving and retaining the fasteners and selectively orienting the fasteners relative to the applicator.

It is still another object of this invention to provide a manually operable device for positioning and driving selected ones of a plurality of screws retained within the device.

It is still another object of this invention to provide a device for positioning and applying selected ones of a plurality of screws which includes a rotatable cylinder positioned adjacent to an engaging portion of a driving shaft and an orienting portion mountable in the cylinder for retaining the screws therein so that the screws may be moved to position a selected screw for engagement by the engaging portion of the driving shaft.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the preferred embodiment of a device of this invention for positioning and applying selected ones of plurality of screws retained in the device which is manually operable;

FIG. 2 is an exploded view of the device shown in FIG. 1;

FIG. 3 is a cross sectional view of the device shown in FIG. 1 taken along section lines 3—3 thereof;

FIG. 4 is an enlarged partial cross sectional view of the screw positioning portion of the device shown in FIG. 3;

FIG. 5 is a cross sectional view of the screw positioning portion of the device taken along section lines 5—5 of FIG. 3;

FIG. 6, is a cross sectional view of the screw orienting portion of the device taken along section lines 6—6 of FIG. 3;

FIG. 7 is a perspective view of packaging for a plurality of screws for assuring ease of loading and advantageous orientation of the screws in the device; and FIG. 8 is a perspective view of a second embodiment of a device for positioning and applying selected ones of a plurality of the screws which is configured for attachment to a power driving tool.

DESCRIPTION OF THE INVENTION

FIGS. 1 through 3 show device 11 for positioning and applying fasteners in accord with this invention, and more particularly, illustrate a manually operable device for positioning and applying selected ones of a plurality of screws retainable in the device to a work surface.

Manually operable device 11 includes handle 13, driving shaft 15, stabilizing shaft 17, and screw positioning mechanism 19 having screw retaining and orienting insert 21 positioned therein.

With particular reference to FIGS. 2 and 3, driving shaft 15 includes a screw engaging portion 25, as shown herein a cross point driving tip (it being understood that a variety of driving tips could be employed, for example a straight bladed tip, a phillips head tip, or a chuck). Driving shaft 15 is firmly affixed to rear wall 27 of handle 13 by, for example, screwing, pressure fitting, gluing, and/or providing ribs on the shaft for fitting through slots in aperture 29 in rear wall 27 of handle 13. Handle 13 may also include gripping ribs 31 for assuring a firm grip by a user of the device during use of handle 13 to rotate shaft 15 and engaging portion 25.

Driving shaft 15 and stabilizing shaft 17 are movably maintained through front wall 35 of handle 13 through apertures 37 and 39, respectively. Stabilizing shaft 17 is maintained through aperture 39 to permit longitudinal movement therethrough, and driving shaft 15 is configured through aperture 37 for rotational movement therein (as indicated by the arrows in FIG. 3).

The forwardmost movement of end portion 41 of stabilizing shaft 17 is limited by head 43 of stop screw 45 which is threaded into end portion 41 of shaft 17. Forward wall portion 35 includes bearing surface 49 around the perimeter thereof for maintaining ball bearings 51 thereat and between outer race 53.

The overall assembly of race 53, bearings 51 and forward wall portion 35 are preferably pressure fitted into end cavity 55 of handle 13 so that race 53 remains in immovable contact with the body of handle 13 thereby permitting the handle, and thus driving shaft 15 and engaging portion 25 thereof, to be rotated while stabilizing shaft 17 and forward wall portion 35 of handle 13 remain stable.

Opposite end 60 of stabilizing shaft 17 is firmly affixed to rear wall 62 of positioning mechanism 19 (for example by gluing, rib mounting, or by embedding flange 65 thereof in a molded end wall or between layers of end wall 62). Spring 66 is mounted over stabilizing shaft 17 between forward wall 35 of handle 13 and rear wall 62 of positioning mechanism 19 to thereby bias head 43 at stop screw 45 toward forward wall 35 of handle 13, while yet allowing movement of stabilizing shaft 17 into handle 13 under exertion from a user of the device.

In this manner, engaging portion 25 of driving shaft 15 may be moved toward engagement with head 68 of screws 70 under exertion by a user of device 11 while yet being biassed toward a return position above the screw heads of the remainder of the screws left in positioning mechanism 19 after driving of a selected screw.

Driving mechanism 19 includes cylindrical housing 75, bearing 77, and rotatable cylinder 79. As shown in FIGS. 2 and 4, housing 75 has end wall 62 affixed thereto (by gluing, pressure fitting, or unitary molding, for example) and includes spring and ball housing 81 having external threads 83 for mounting in aperture 85 in end wall 62 having female threads 87 therein.

End wall 62 includes stabilizing shaft mounting block 90 for firmly maintaining stabilizing shaft 17, and annular bearing mounting ridge 92 having external threads 94 thereat for receiving bearing 77 at internal threads 96 thereof. Rotatable cylinder 79 is firmly mounted to bearing 77, for example by known techniques such as gluing, pressure fitting, welding and the like.

Shaft 15 is maintained through aperture 99 in rear wall portion 62 and slot 101 in the inner portion of bearing 77 and is freely rotatable therethrough. Bearing 77 is a standard type ball bearing including balls 103 and outer race 105 (to which rotatable cylinder 79 is affixed).

By this arrangement, rotatable cylinder 79 may be rotated within housing 75 around stabilizing shaft 17, driving shaft 15 and end wall 62 for selective positioning of screws 70 for engagement of selected ones thereof by engaging portion 25 of driving shaft 15 as more fully set forth hereinafter. The proper positioning of screw heads 68 relative to engaging portion 25 of driving shaft 15 is assured by ball and detent arrangement 110 (as shown in FIGS. 4 and 5) in conjunction with the positioning of screw retaining and orienting insert 21 in rotatable cylinder 79 using slot 112 and key 114 (as shown in FIGS. 2 and 6).

Ball and detent arrangement 110 includes spring 116, positioning plate 118 and ball 120, all maintainable within housing 81. Detents 122 (shown in FIGS. 4 and 5) are positioned on the upper portion of race 105 so that engagement of ball 110 with a selected one thereof upon rotation of rotatable cylinder 79 corresponds to the proper position of a screw head 68 and engaging portion 25 of the driving shaft for engagement therebetween. Upon rotation of the rotatable cylinder 79 (as more fully set forth hereinbelow) ball 110 is forced upward from detent 122 into housing 81 until rotation of the upper surface of race 105 brings the ball into engagement with another of the detents 122, whereupon spring 116 will bias ball 120 into the detent and another screw head will be properly positioned for engagement by engaging portion 25 of driving shaft 15.

Screw retaining and orienting insert 21 of device 11 includes outwardly extending grips 125 which extend outwardly of housing 75 when insert 21 is inserted into rotatable cylinder 79. Insert 21 is maintained in rotatable cylinder 79 by clips 127 at the lower side of each of grips 125 which are snapped over annular flange 129 of rotatable cylinder 79 extending from the open end of housing 75.

Insert 21 includes a plurality of cylindrical chambers 130 therethrough and annularly positioned in insert 21 relative to one another within which screws 70 are oriented and maintained until used. Slotted openings 132 are provided at the end of each of the cylindrical chambers to provide for viewing of the screws maintained in the chamber to allow proper positioning of the screw tip at the application surface. Each of the slotted openings 132 reside between the different ones of gripping portions 125.

It should be appreciated that length 140 of insert 21, and therefore cylindrical chambers 130, may be varied in manufacture from one insertable portion to another to thereby accommodate screws of different lengths. In addition, different inserts 21 could provide cylindrical portions 130 having different diameters, and/or cylindrical portions 130 of insert 21 could be provided with sleeves, to better orient and maintain a screw having a larger or smaller diameter.

Screws 70 may be initially provided to a user in a prepackaged state for ease of loading into chambers 130 of insert 21, for example using ring mounting 145 as shown in FIGS. 6 and 7. Ring mounting 145 can be made of any material capable of holding the screws but yet being easily rent (for example lightweight plastics, paper, paper board and the like) so that the screws will break through the ring retainer upon application of force from a user of the device through driving shaft 15.

While a ring retainer as illustrated is particularly well suited for use with the device, it should be appreciated that a number of screw packagings for maintaining the screw in the chambers could be employed, such as, for example, a plastic or mylar spiral fitted around the body of the screw and configured to snugly fit within the chambers to thereby maintain the screws in the chamber and yet break away when force is applied. In addition, retainers could be separately provided to a user of the device for mounting of screws thereon by the user.

In use, insert 21 is removed from the device by pulling on grips 125 so that snaps 127 are released from flange 129. Prepackaged screws, or selected ones of single screws, are then inserted into chambers 130. Insert 21 is then reinserted into positioning mechanism 19 by aligning key 114 with slot 112 in rotatable cylinder 79 and forcing snaps 127 over flange 129.

When fully loaded with screws, a screw will automatically be aligned with engaging portion 25 of driving shaft 15. A user of the device will then position the aligned screw over a work surface by aligning the screw tip with the position on the work surface to which it is to be applied, sighting the tip of the screw through slot 132 in insert 21. By pressing handle 13 downward toward the work surface, thus compressing spring 66 as stabilizing shaft 17 moves rearward within handle 13, engaging portion 25 of driving shaft 15 will be brought into contact with head 68 of the selected screw 70. Thereafter, handle 13 is rotated thus turning shaft 15 so that engaging portion 25 engages the head of the screw 70 and turns the screw, freeing the screw from ring retainer 145 as pressure is continually applied toward the work surface. Rotation and pressure are continually applied by the user until embedded as desired in a conventional manner.

When application is completed, handle 13 is returned to its original position by spring 66 thus withdrawing engaging portion 25 of driving shaft 15 from the cylindrical chamber 130 in which the screw just driven was formerly maintained. The user of the device then grasps and rotates manipulating portions 125 to thereby rotate insert 21 and rotatable cylinder 79 around bearing 77 until ball 120 reengages another of the detents 122 indicating that another screw 70 has been aligned with engaging portion 25 of driving shaft 15. The process is repeated until all chambers 130 are empty, at which time insert 21 may be withdrawn from positioning mechanism 19, reloaded with screws, and reinserted into positioning mechanism 19 for further use of the device.

Turning now to FIG. 8, a second embodiment 150 of the device is shown for use with driving tool 152 herein a drill motor. Positioning mechanism 19 and screw retaining and orienting insert 21 are in most regards similar to those portions of device 11 shown in FIGS. 1 through 6.

No stabilizing shaft is provided however, stabilization being accomplished by a user of the device gripping the cylindrical housing 75 at scored grip 154 to thereby stabilize positioning mechanism 19 on a work surface. Rear wall 62 of positioning mechanism 19 is provided with driving shaft stabilizer housing 156 having driving shaft 15 maintained therethrough. Housing 156 has a bearing therein (not shown) to provide more stable rotational and longitudinal operation of shaft 15. Shaft 15 has no handle portion at the end thereof, being instead removably insertable into the standard shaft grip of drill motor 152. No return spring need be provided, shaft 15 being manually movable through positioning mechanism 19 for use as described heretofore.

The various elements of the device of this invention are made of a variety of conventional materials. For example, the shafts can be made of hardened steel, carbon steel and the like, and with the bearings and the like being conventional. Insert 21, handle 13, rotatable cylinder 79 and housing 75 can be made of a variety of materials including plastics, metal, and the like.

As may be appreciated from the foregoing, a device for positioning and applying selected ones of a plurality of fasteners, for example screws, which are retainable in the device, is provided which includes a reloadable fastener retaining and orienting portion insertable into a positioning mechanism which includes a rotatable cylinder for positioning a selected fastener adjacent to an engaging portion of a driving shaft for engagement thereof with the fastener for application to a work surface by a user of the device.

What is claimed is:

1. A device for positioning and applying selected ones of a plurality of fasteners retainable in the device comprising:

application means having an engaging portion for engaging said fasteners connected to said application means a movable portion for causing predetermined desired movement of a selected one of said fasteners engaged by said engaging portion to thereby effect application of said selected fastener and a second portion having said movable portion rotatably mounted thereat;

positioning means having a plurality of chambers therein for receiving said plurality of fasteners so that preselected relative positioning of each of said fasteners is maintained therein relative to one another, said positioning means further including a first part for maintaining said engaging portion of said application means therethrough so that said engaging portion is maintained adjacent to said plurality of fasteners in said chambers of said positioning means, said positioning means including movement establishing means connected between said chambers and said first part for causing relative movement between said chambers and said engaging portion of said application means so that said plurality of fasteners are selectively positionable relative to said engaging portion of said application means for engagement thereof with a selected fastener in a selected chamber of said positioning means, and a stabilizing portion having first and second ends, said first end being attached to said first part of said positioning means and said second end being movably mounted through said second portion of said application means so that said movable portion of said application means is rotatable relative to said second portion of said application means and said second end of said stabilizing portion.

2. The device of claim 1 wherein each of said chambers is configured for receipt of a different one of said fasteners therein.

3. The device of claim 1 wherein said movement establishing means of said positioning means includes a rotatable cylinder having said plurality of chambers therein.

4. The device of claim 1 wherein said positioning means includes receiving and retaining means having said plurality of chambers therein for receiving and retaining said plurality of fasteners, said receiving and retaining means being releasably attachable to said movement establishing means.

5. The device of claim 1 wherein said application means includes hand movable means connected with said movable portion for causing movement of said movable portion of said application means.

6. A device for positioning and applying selected ones of a plurality of fasteners retainable in the device, said fasteners having first and second opposite ends, said device comprising:

orienting means for receiving said plurality of fasteners therein so that preselected positioning of said opposite ends of each of said fasteners relative to corresponding said opposite ends of others of said fasteners is maintained;

application means having an engaging portion configured to engage a first part of said fasteners and a movable portion for causing predetermined desired linear and rotational movement of a selected one of said fasteners engaged by said engaging portion to thereby effect application of said selected fastener;

positioning means for receiving said orienting means and said engaging portion of said application means therein and including a rotatable portion releasably engagable with said orienting means for selective relative positioning of said first ends of said fasteners and said engaging portion of said application means for engagement thereof with a selected one of said fasteners in said orienting means when said rotatable portion is rotated to cause preselected relative positioning of said first end of said selected fastener and said engaging portion of said application means; and disposable packaging means receivable on said orienting means for holding said first ends of said plurality of fasteners in said preselected positioning.

7. The device of claim 6 wherein said application means includes manually movable means connected to said movable portion for selectively manually imparting both rotational and linear motion to said engaging portion of said application means.

8. The device of claim 6 wherein said positioning means includes a cylindrical housing for maintaining said rotatable portion of said positioning means therein, and wherein said cylindrical housing and said rotatable portion include cooperative position securing means for assuring proper positioning of said selected fastener relative to said engaging portion of said application means.

9. The device of claim 6 wherein said orienting means is releasably connected with said rotatable portion of said positioning means so that at least a first part of said fasteners is maintained within said rotatable portion and wherein said rotatable portion and said orienting means are manually rotatable thus moving said plurality of fasteners in said orienting means for selective engagement of said fasteners with said engaging portion of said application means.

10. The device of claim 6 wherein said plurality of fasteners are screws and wherein said first part thereof is a screw head, and wherein said engaging portion of said application means includes means for engaging said screw head.

11. A manually operable device for positioning and driving a selected ones of a plurality of screws having engagable heads comprising:

a driving shaft having a handle and an engaging portion configured to engage said engagable head of a selected one of said plurality of screws said handle including first and second parts movable relative to one another;

a cylindrical housing having said engaging portion of said driving shaft movably mounted through a first portion thereof;

a stablizing portion having first and second ends, said first end being attached to said first portion of said housing and said second end being movably mounted through said second part of said handle so that said first part of said handle is rotatable around said second part of said handle and said second end of said stabilizing portion;

a rotatable cylinder rotatably mounted in said cylindrical housing and having an open end portion;

orienting means for receiving said plurality of screws so that said engagable heads of said screws are arranged substantially in a circle therein, said orienting means being releasably mountable in said open end portion of said rotatable cylinder so that said circle defined by said arrangement of said engagable heads of said screws in said orienting means is adjacent to said engaging portion of said driving shaft, whereby said engagable heads of said screws are selectively positionable relative to said engaging portion of said driving shaft by rotation of said rotatable cylinder for engagement of said engagable head of a selected one of said screws in said orienting means by said engaging portion of said driving shaft to thereby directly apply said screw at a work area.

12. The device of claim 11 wherein said orienting means includes a plurality of cylindrical chambers for receipt of said plurality of screws.

13. The device of claim 12 wherein said cylindrical housing and said rotatable cylinder include cooperative position securing means for assuring positioning of said engaging portion of said driving shaft for engagement with said engagable heads of said screws.

14. The device of claim 11 further comprising biasing means mounted between said handle and said cylindrical housing for biasing said housing away from said handle of said driving shaft.

15. The device of claim 11 further comprising disposable retainer means receivable on said orienting means for retaining said plurality of screws in said orienting means.

* * * * *

UNITED STATES PATENT AND TRADEMARK OFFICE
CERTIFICATE OF CORRECTION

PATENT NO. : 4,936,169

DATED : June 26, 1990

INVENTOR(S) : Parsons

It is certified that error appears in the above-identified patent and that said Letters Patent is hereby corrected as shown below:

Column 6, lines 13 and 14, "fasteners connected to said application means a movable portion" should be --fasteners, a movable portion connected to said application means--.

Signed and Sealed this

Fifteenth Day of October, 1991

Attest:

HARRY F. MANBECK, JR.

*Attesting Officer*  *Commissioner of Patents and Trademarks*